April 2, 1935. J. F. DUBY 1,996,409
WHEEL ALIGNING GAUGE
Filed Jan. 7, 1931
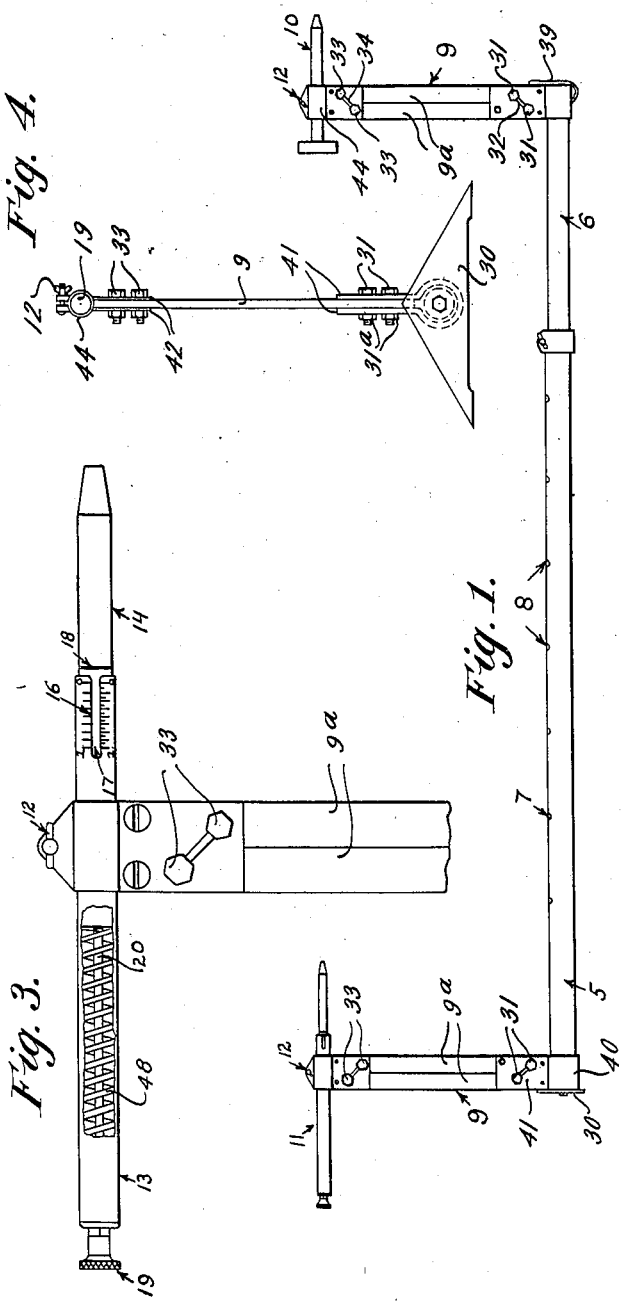
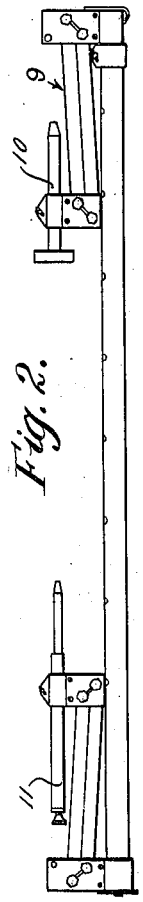
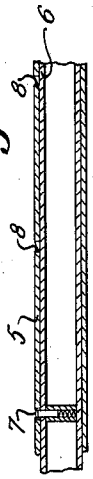
INVENTOR.
John Fahrun Duby Patented Apr. 2, 1935

1,996,409

UNITED STATES PATENT OFFICE 1,996,409

WHEEL ALIGNING GAUGE

John Fabien Duby, Boston, Mass.

Application January 7, 1931, Serial No. 507,215

11 Claims. (Cl. 33—203)

This invention relates to a gauge or instrument whereby the wheels of vehicles may be trued up and brought into alignment or parallelism, the object, when rubber tired wheels are used, being to prevent objectional wear of the tires due to misalignment or deviation from the proper plane of rotation.

Wheel aligning gauges have been limited in their use to certain vehicles, and have lacked portability or ease of securing the reading. The purpose of my invention is to devise a gauge which can be used on all cars, trucks, and buses, that will be easily folded for carrying purposes and that will show the reading in plain sight of the operator without the necessity of any figuring or calculating.

To these and other related ends the invention consists in the improvements which I will now proceed to describe and claim.

In the accompanying drawing:

Fig. 1 is a front elevational view of the gauge in operating position;

Fig. 2 is a front elevational view of the gauge in folded position;

Fig. 3 is an enlarged elevational detail of one end portion of the gauge;

Fig. 4 is an end view of the gauge; and

Fig. 5 is a central sectional detail of the telescoping body portions of the gauge.

My improved wheel aligning gauge comprises an adjustable body, adapted to be extended to measure the distance between two points on two wheels to be tested. The body is composed of two members, one of which is adapted to slide within or upon the other. Each member is provided with an upwardly swinging arm carrying gauging members adapted to bear simultaneously on either the inner or outer sides of the wheels. This allows measurements on the outer side of both wheels on narrow treads, and on the inner side of one wheel and the outer side of the other wheel on medium treads, and on the inner side of both wheels on wide treads giving equal utility for all general widths of treads.

One of the body members is composed of an adjustable section to vary the length of the gauge and is provided with means for locking said members together to maintain any adjusted length of said gauge. One of the upwardly swinging arms is provided with a gauging member which may be fixed or adjustable, and the other arm is provided with a yieldingly adjustable gauging member associated with a movable zero point for the first reading so eliminating any calculating and directly giving the true result on the second reading. A spring is employed to yieldingly tend to maintain a shorter distance between the terminals than the distance between the wheel parts on which the terminals bear. The spring is of sufficient tension to hold its terminal against the wheel but not of sufficient tension to cause the opposite terminal to pull away from the wheel.

The upright arms and gauging members are foldable allowing minimum of space and ease of portability.

I will now describe the preferred embodiments of the invention shown by the drawing.

The sectional body member of variable length is composed of an outer tube 5 and an inner tube 6 slidable in the outer tube. A detent 7 carried by the inner tube 6 is projected by a spring through an orifice in the inner tube and into any of a series of orifices 8 in the outer tube 5. A shoe 39 is connected to the end of tube 6 to rest on the floor, while a substantially triangular member 30 extends transversely at the end of tube 5 to cooperate in supporting the gauge in an upright position.

The outer end of each tube 5 and 6 is provided with a collar 40 carrying upwardly extending parallel flanges 41, juxtaposed pairs of bars 9a cooperating to form arms 9 at each end of the gauge and are pivotally connected to the flanges 41. For this purpose I preferably provide a pivot bolt 31 at the lower end of each bar 9a, the heads of these bolts being connected by locking pins 32 (Fig. 1) to prevent their turning when the nuts 31a, shown in Fig. 4, are loosened or tightened. Thus the arms 9 may be swung upwardly to their operative positions, as shown in Fig. 1, or folded downwardly, as shown in Fig. 2. The pivot bolts 31 and 33 are so arranged as to maintain parallelism at all times between the gauge members 10 and 14 with respect to the body members 5 and 6. The upper ends of the bars 9a are pivotally connected to parallel flanges 42, which are secured to clamping collars 44, the latter being split and provided with hand screws 12, whereby the gauging members 10 and 11 may be clamped in adjusted position. Locking pins 34 connect bolts 33 in the same general manner as pins 32 connect bolts 31. It is thus evident that when the uprights are folded, the gauging members 10 and 11 will move into positions wherein they are substantially parallel to the telescoping tubes 5 and 6. It is also evident that the arms 9a may be clamped for use at any desired angle between closed and full open position thus allowing measurements to be taken at any desired height from the floor.

Gauging member 11 is composed of tube 13 and moving cylinder 14 which yieldingly contacts with the wheel against which it is placed by means of spring 48. The tube 13 is slidably adjustable lengthwise in clamping collar 44 and locked by means of the screw 12 and the cylinder 14 can be withdrawn into the tube 13 by means of the knob 19 which is firmly attached to the cylinder 14 by rod 20. On tube 13 is placed graduated scales 16. On the cylinder 14 is a pointer mark 18 which is visible through the slot 17 and engaging with scale 16. The gauge may be operated as follows.

The sections 5 and 6 of the body can be adjusted so that the distance between the gauging member 10 and cylinder 14 is approximately the same as the distance between the wheel points on which they are to bear. With the pointer end of the gauge towards the operator, the gauging member 10 is placed against the wheel.

Loosening the thumb nut on the arm carrying the gauging member 11, the tube is adjusted lengthwise in clamping collar 44 so that while the cylinder bears against the wheel the ring or pointer mark on the cylinder is opposite the zero mark of the scale. The thumb nut is tightened retaining the position of the tube with respect to the arm 9. The spot where the cylinder bears against the wheel is marked. The gauge is now removed from position and the operator moves the vehicle causing the wheel to turn until the marked spot is carried to a position on the opposite side of the axle. The gauge is placed in its second position on the opposite side of the axle. The cylinder is manually retracted into the tube, the gauge swung into place and the cylinder allowed to reissue from the tube and bear against the marked spot on the wheel and the operator may note by reading the scale if there is any variation from the first reading of zero.

The adjustability of the tube 13 to obtain a first reading of zero eliminates any necessity of calculation after the second reading. If there is any variation between the two readings then the pointer mark 18 will so indicate by its position on either side of zero as the case may be. Obviously, if the wheels are parallel then the second reading will be zero also.

I am not limited to the specific mechanism of the preferred embodiment of my improvements as shown by the drawing except as otherwise required in certain of the limited claims.

I regard any construction of the body providing two parallel members slidable lengthwise relatively to each other to render the body adjustable as to its length, its foldability, and yielding means with its phase of simplicity of reading the result, as within the scope of my invention as defined by the appended claims.

It should be understood that the present disclosure is for the purpose of illustration only and that this invention includes all modifications and equivalents which fall within the scope of the appended claims.

I claim:

1. A wheel aligning gauge comprising an adjustable body composed of members relatively movable to lengthen or shorten the body, arms pivoted at the outer ends of said body members and swingable from folded to operating position, elongated gauging members supported by said arms, and means for maintaining parallelism between the gauging members and the body members of the gauge at all times.

2. A wheel aligning gauge adapted to rest upon a floor and having an elongated body portion, arms pivoted at the outer ends of said body portion and swingable from folded to operating position, elongated gauging members carried by said arms, and means for maintaining parallelism between the gauging members and said body portion when the arms are in either folded or operating position.

3. A wheel aligning gauge adapted to rest upon a floor and having an elongated body portion, arms pivoted adjacent one end thereof at the outer ends of said body portion and swingable from folded to operating position, supporting means provided at the free end of each arm adapted to carry a gauging member, and means to maintain a given angular relationship between said supporting means and the body portion of the gauge at all times.

4. A wheel aligning gauge adapted to rest upon a floor and having an elongated body portion, arms pivoted at the outer ends of said body portion and swingable from folded to operating position, elongated gauging members carried by said arms, means for maintaining parallelism between the gauging members and said body portion, when the arms are in either folded or operating position, at least one of said gauging members comprising a spring-pressed wheel-engaging element, and means to indicate the position of said element relative to its associated arm while the element is in contact with a wheel part.

5. A wheel aligning gauge adapted to rest upon a floor and having an elongated body portion, arms pivoted at the outer ends of said body portion, said arms being swingable towards each other when moved from operating to folded position, cylindrical gauging members supported by said arms, and means to provide substantially parallel positioning of the gauging members relative to said body portion of the gauge when the swingable arms are in folded position.

6. A wheel aligning gauge adapted to rest upon a floor and having an elongated body portion, arms pivoted at the outer ends of said body portion and swingable from folded to operating position, elongated gauging members carried by said arms, means for maintaining parallelism between the gauging members and the body portion of the gauge in all operating positions of said members, and means to maintain desired angular positioning of the arms relative to said body portion.

7. A wheel aligning gauge adapted to rest upon a floor and having an elongated body portion, arms pivoted at the outer ends of said body portion and swingable from folded to operating position, elongated gauging members carried by said arms, means for maintaining parallelism between the gauging members and the body portion of the gauge in all operating positions of said members, at least one of said gauging members including an elongated housing, and a wheel-engaging member slidably mounted within said housing.

8. A wheel aligning gauge adapted to rest upon a floor and having an elongated body portion, arms pivoted at the outer ends of said body portion and swingable from folded to operating position, elongated gauging members carried by said arms, means for maintaining parallelism between the gauging members and the body portion of the gauge in all operating positions of said members, at least one of said gauging members including an elongated housing, and means to maintain said housing in desired adjusted relationship with respect to its supporting arm.

9. A wheel aligning gauge adapted to rest upon a floor and having an elongated body portion, arms pivoted at the outer ends of said body portion and swingable from folded to operating position, elongated gauging members carried by said arms, means for maintaining parallelism between each gauging member and the body portion of the gauge in all operating positions of said members, said means comprising parallel arms and a plurality of pivot members, the latter being positioned in quadrilateral arrangement.

10. A wheel aligning gauge adapted to rest upon a floor and having an elongated body portion, arms pivoted at the outer ends of said body portion and swingable from folded to operating position, elongated gauging members carried by said arms, means for maintaining parallelism between the gauging members and the body portion of the gauge in all operating positions of said members, and indicating means associated with at least one of said gauging members.

11. A wheel aligning gauge adapted to rest upon a floor and having an elongated body portion, arms pivoted at the outer ends of said body portion and swingable from folded to operating position, elongated gauging members carried by said arms, means for maintaining parallelism between the gauging members and the body portion of the gauge in all operating positions of said members, at least one of said gauging members including an elongated housing, a wheel-engaging member slidably mounted within said housing, and manually operated means to facilitate movement of said wheel-engaging member lengthwise in said housing.

JOHN FABIEN DUBY.